March 23, 1937.  H. JUNKERS  2,074,510
CENTRIFUGAL FRICTION CLUTCHING DEVICE
Filed Nov. 30, 1931
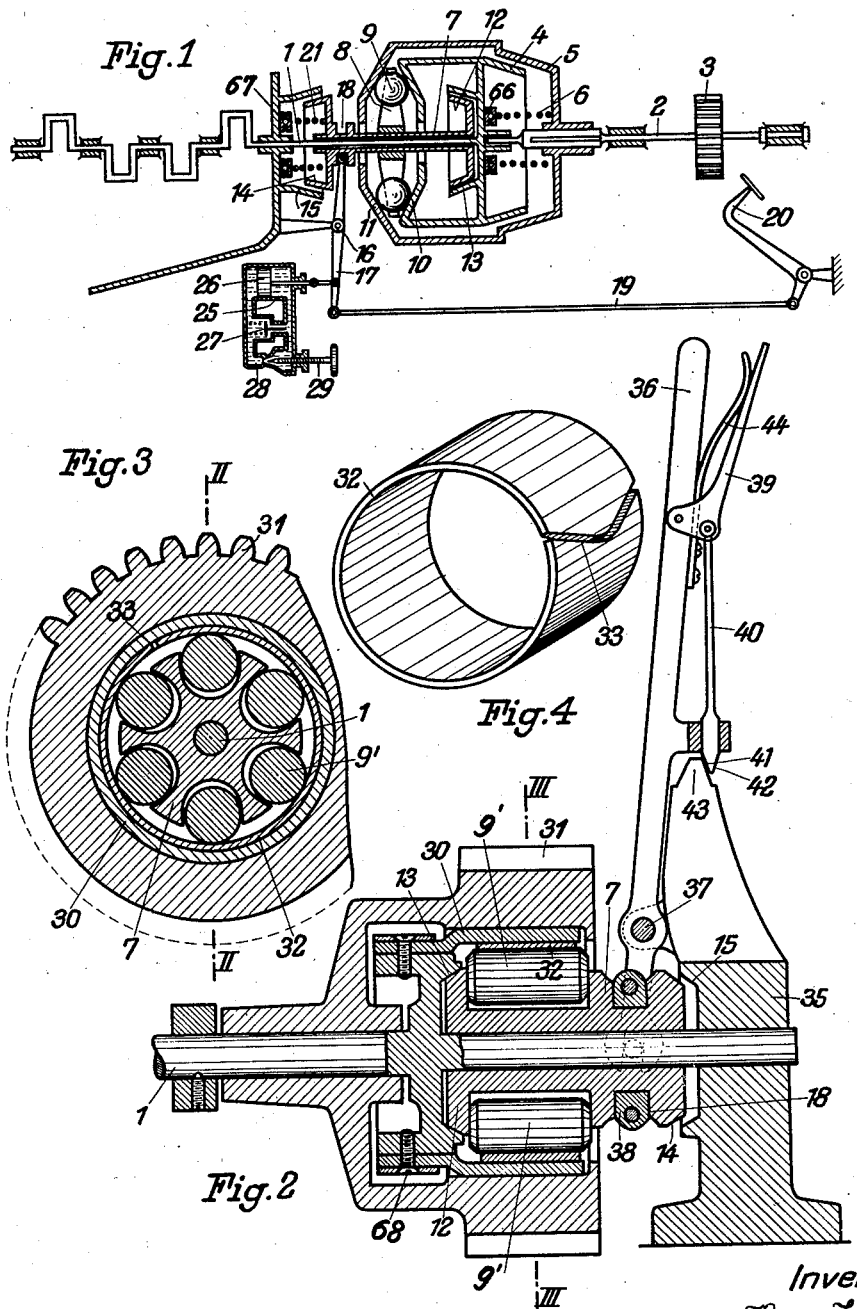
Inventor:
Hugo Junkers Patented Mar. 23, 1937

2,074,510

UNITED STATES PATENT OFFICE 2,074,510

CENTRIFUGAL FRICTION-CLUTCHING DEVICE

Hugo Junkers, Dessau, Germany, assignor, by mesne assignments, to Junkers Flugzeug-und-Motorenwerke Aktiengesellschaft, Dessau, Germany Application November 30, 1931, Serial No. 577,916
In Germany December 10, 1930

11 Claims. (Cl. 192—103)

My invention relates to centrifugal friction-clutching devices, and more particularly to a device which includes a main clutch and an auxiliary clutch for throwing in and out the main clutch.

It is an object of my invention to provide an improved clutching device of the kind described. To this end, in combination with: a driving and a driven part making up the main clutch and having friction faces, centrifugal elements adapted to connect the friction faces for torque transmission, a holder for the centrifugal elements which is arranged to move independently of the driving and the driven part, and an auxiliary clutch for connecting the holder to the driving part; I provide means adapted to be operated independently of the operating condition of the main clutch for throwing in and out the auxiliary clutch.

The auxiliary clutch connects the holder for the centrifugal elements—which may be balls or rollers—to the driving part of the main clutch, and automatic means, such as a spring, is provided for holding the auxiliary clutch in its thrown-in position. The centrifugal elements rotate with the holder and finally throw in the main clutch by connecting its friction faces for torque transmission. A pedal, or a manually operated lever, is provided for throwing out the auxiliary clutch against the action of the spring. When the auxiliary clutch has been thrown out, the holder for the centrifugal members will come to rest, being assisted therein by an automatic brake, and the parts of the main clutch are separated.

The means for throwing in and out the auxiliary clutch are the spring which tends to hold this clutch in its thrown-in position, and the pedal or lever by which the spring is controlled, i. e., allowed to throw in the auxiliary clutch, or prevented from doing so. The throwing-in and out-means are adapted to be operated independently of the condition of the main clutch. It does not make a difference with respect to the operation of these means whether the parts of the main clutch are disconnected or connected, these means being operated with equal facility no matter whether the main clutch shall be thrown in or out or whether it rotates at high or low speed.

Centrifugal friction clutching devices as designed heretofore are either automatic and without any means for controlling them as desired, or they are equipped with controlling means, but the latter are either highly involved or the possibilities of operating them are limited.

In the drawing affixed to this specification and forming part thereof, a centrifugal clutching device for connecting aligned driving and driven shafts, and another device for connecting a wheel mounted freely on a driving shaft, to the driving shaft, are illustrated diagrammatically by way of example.

In the drawing

Fig. 1 is an axial section of the shaft-connecting device whose centrifugal elements directly engage the driving and driven parts of the main clutch, Fig. 2 is an axial section, on the line II—II in Fig. 3, of the wheel-connecting device in which a friction sleeve is interposed between the centrifugal members and the wheel, Fig. 3 is a section on the line III—III in Fig. 2, and Fig. 4 is a perspective illustration of an annular race for the centrifugal members of the clutch illustrated in Fig. 2.

Referring now to the drawing, and first to Fig. 1, the driving shaft 1 may be the crank shaft of an internal combustion engine whose four crank throws, bearings and rear end of crank case, are partly shown. The driven shaft 2 which supports a pinion 3, or any other power-transmitting means, is mounted in a pair of bearings in axial alignment at the rear of the driving shaft 1.

4 and 5 are the two nested hollow clutching members of the main clutch. The driving inner member 4 is substantially a hollow cylinder with a flat transverse web between its ends. The web may be integral with the driving shaft 1, as shown, or connected to the shaft by a boss and key, or the like. A sleeve projecting from the rear face of the transverse web supports the front end of the driven shaft 2. The rear end of the driving member 4 is tapered and presents a friction face adapted to fit a tapered friction face at the rear end of the driven member 5 which, like the driving member 4, is substantially a hollow cylinder surrounding the member 4 in spaced relation, and is splined on the driven shaft 2 with a suitable boss on a flat web at its rear end.

The front ends of the two main clutching members 4, 5 make up together a race for centrifugal elements 9 by presenting oppositely tapered webs 10 and 11, repectively, at their front ends. A spring 6 whose front end is supported in an anti-friction bearing 66 on the flat web of driving member 4, and whose rear end is abutted against the flat web at the rear of the driven member 5, tends to move the tapered webs 10 and 11 nearer together.

The holder for the centrifugal elements 9 comprises a tubular member 7 mounted for free relative rotation and shifting movement on the driving shaft 1, independently of the driving and driven parts, and a cage 8 for the ball-shaped elements 9 which is keyed on the tubular member 7.

A cap 12 with a tapered flange is formed at the rear end of the tubular member 7 and adapted to cooperate with a corresponding cup 13 on the inner side of the flat web of driving member 4. The two cups make up the auxiliary clutch by which the holder 7, 8 is connected to, and rotates with, the driving member 4. A brake which is similar to the auxiliary clutch 12, 13 and comprises a tapered cup 14 on the front end of the tubular member 7 and a mating cup 15 on the crankcase of the engine, is equipped with a spring 21 whose front end is supported by an antifriction bearing 67 on the crank case and whose rear end bears against the bottom of cup 14, throws in the auxiliary clutch 12, 13 unless prevented by a pedal, or other member, 20, a rod 19, a double armed lever 17 fulcrumed on the crank case at 16, and a neck ring 18 on the tubular member 7 which is engaged by the free end of the lever 17. Preferably, the movement of the clutch-shifting rigging is damped in one direction by means of a cylinder 25 filled with oil or the like, a piston 26 in the cylinder which is connected to the lever 17, a check valve 27, a restricted orifice 28, and a needle valve 29 for regulating the free sectional area of the orifice.

The spring 21 is the means for throwing in the auxiliary clutch 12, 13. When the pedal 20 is released, as shown, the spring 21 is free to throw in the auxiliary clutch while throwing out the brake 14, 15, so that the holder 7, 8 rotates freely with the driving shaft 1 and the driving clutching member 4. Under centrifugal action, the centrifugal elements gradually move outwardly on their cage 8, moving apart the races 10 and 11 and moving the tapered friction faces of members 4 and 5 nearer together until the main clutch 4, 5 is thrown in. The cage 8 is so connected to its balls or centrifugal elements 9 that it is free to move transversely to the central plane in which the balls 9 run, thus becoming slightly disaligned with respect to such plane. However, this movement of the cage is quite small while on the other hand the races 10 and 11 are at such a minimum distance from each other that they do not interfere with the cage as it moves.

When it is desired to break the connection of the holder 7, 8 and the driving clutching member 4, the auxiliary clutch 12, 13 is thrown out by depressing the pedal 20. Through the rigging described, the tubular member 7 is moved to the left, or in forward direction, throwing out the auxiliary clutch 12, 13, disconnecting the holder 7, 8 from the driving member 4, and throwing in the brake 14, 15. The movement of the rigging pulls the piston 26 to the right and dispels the liquid from its cylinder through the check valve 27 which does not offer any appreciable resistance to the flow of the liquid and the movement of the piston, so that the auxiliary clutch is thrown out, and the brake is thrown in, immediately upon operation of the pedal 20. The holder 7, 8 being now arrested, there is no longer any centrifugal action which holds the friction faces of the main clutching members 4, 5 engaged through the centrifugal members or balls 9, and the spring 6 is free to throw out the main clutch.

To throw in the auxiliary clutch, or, rather, to allow the spring 21 to throw it in, the pedal 20 is released, but now the piston 26 moves to the left and the liquid is gradually dispelled through the restricted orifice 28, preventing abrupt throwing in of the auxiliary clutch, even if the pedal 20 is operated suddenly. When the auxiliary clutch has been thrown in, it throws in the main clutch 4, 5 through the centrifugal elements 9, as described.

The friction faces of the main clutching members, and the race for the centrifugal elements, are not necessarily tapered, as shown in Fig. 1, and a clutching device having cylindrical friction faces and a cylindrical race, will now be described with reference to Figs. 2–4.

In this device, only the driving shaft 1 is provided, and the driven shaft 2 is replaced by a wheel 31, here shown as a spur gear, which is mounted to rotate freely on the driving shaft 1 with a long boss projecting from its front end. The rear portion of the spur gear 31 is hollow and receives certain parts of the clutching device, as will as described. The driving shaft 1 may be integral with a crank shaft, as shown in Fig. 1, or operated by any other suitable means.

The driving shaft 1 is integral with a transverse web, as in Fig. 1, and a tapered recess 13 is formed in the web as the female member of the auxiliary clutch whose male member 12 is a tapered disk at the front end of the tubular member 7. The rear end of the tubular member projects from the hollow spur gear 31 and supports the male member 14 of the brake whose female member is a tapered cavity 15 in a bracket 35. This bracket supports the rear end of the driving shaft 1.

The holder 8 for the centrifugal elements 9, Fig. 1, is dispensed with in the device illustrated in Figs. 2–4, and, instead, the central portion of the tubular member is fluted for the reception of rollers 9′, as best seen in Fig. 3, which replace the balls 9 shown in Fig. 1. The rollers, under centrifugal action, cooperate with the cylindrical inner face of the hollow spur gear 31 not directly but through the medium of a pair of sleeves 30 and 32. The outer sleeve 30 is an undivided friction lining which at its front end is secured to the transverse web of the driving shaft by screws 68 and bears against the inner wall of the cavity in the spur gear 31 with its outer perimeter. The inner sleeve 32 is inserted with the object of presenting a race to the rollers 9′ on which they run more easily than on the friction lining 30. The race 32 is split at 33, Fig. 4, so that it can expand under the centrifugal pressure of the rollers 9′, and the split is V-shaped to facilitate the running of the rollers 9′ across the gap. The friction lining 30, being undivided, must be capable of yielding radially. To this end, it may be made of rubber or some other resilient material, or of fabric having a certain amount of "stretch", or such a fabric may be embedded in resilient material.

The tubular member or holder 7 in Figs. 2–4 is movable independently of the driving part 1 and the driven part 31, exactly like the member 7 and the holder 8 in Fig. 1, and may be shifted axially by any suitable means. In the present instance, a lever 36 whose lower end is forked, is fulcrumed on the bracket 35 at 37. The fork engages a ring 38 in the neck 18 of the tubular member 7. 43 is a wedge-shaped lug at the upper end of the bracket 35 which is adapted to be engaged by wedge faces 41 and 42 at opposite sides of a catch 40 whose lower end slides in a guide at the lever 36, its upper end being connected to a trigger 39 equipped with the usual spring 44.

When the lever 36 is moved to the rear, as shown in Fig. 4, the wedge face 41 at the front side of catch 40 engages the wedge face at the rear of the lug 43. The pressure of spring 44 and the component it produces at the two engaging wedge faces, holds the members of the auxiliary clutch 12, 13 engaged and thus performs the function of the spring 21 in Fig. 1. The tubular member 7 now rotates with the driving shaft 1 until the rollers 9', under centrifugal action, expand the race 32, compress the lining 30 in radial direction, and connect the spur gear 31 to the driving shaft 1. There is no shifting of the driving and driven parts, as in Fig. 1, and so the spring 6 in Fig. 1 is not required in the device shown in Figs. 2–4.

To throw out the clutching device, the lever 36 is moved in forward direction, throwing out the auxiliary clutch 12, 13, and setting the brake 14, 15 which is held in position by the pressure of the spring 44 and the component now produced by the front wedge face of the lug 43 and the rear wedge face 42 of the catch 40. The centrifugal pressure of rollers 9' against the race 32 and the lining 30 ceases and the gear 31 is disengaged from the driving shaft 1.

It will appear that the operation of the devices illustrated in Fig. 1 and in Figs. 2–4 is substantially similar, notwithstanding the structural differences of the two devices, since in both devices the auxiliary clutch 12, 13 is thrown in and out independently of the operating condition of the main clutch, and at any speed.

The manipulation of both devices is very easy, particularly with respect to the throwing-out of the clutch, since for throwing out only the pressure of the springs 21 (Fig. 1) or 44 (Figs. 2–4) which holds the auxiliary clutch 12, 13 engaged, must be overcome and this pressure is quite small as compared with the combined action of centrifugal force and a clutching spring, as provided in certain clutches designed heretofore.

I claim:—

1. A centrifugal friction-clutching device comprising a main clutch including a driving and a driven part, friction faces on both parts, centrifugal elements adapted to connect said friction faces for torque transmission, a holder for said centrifugal elements which is arranged to move independently of said driving and driven parts, an auxiliary clutch adapted to connect said holder to said driving part, and means adapted to be operated independently of the operating condition of the main clutch for throwing in and out said auxiliary clutch.

2. A centrifugal friction-clutching device comprising a main clutch including a driving and a driven part, friction faces on both parts, centrifugal elements adapted to connect said friction faces for torque transmission, a holder for said centrifugal elements which is arranged to be rotated and shifted axially independently of said driving and driven parts, an auxiliary clutch adapted to connect said holder to said driving part, and means adapted to be operated independently of the operating condition of the main clutch for throwing in and out said auxiliary clutch.

3. A centrifugal friction-clutching device comprising a main clutch including a driving and a driven part, friction faces on both parts, centrifugal elements adapted to connect said friction faces for torque transmission, a holder for said centrifugal elements which is arranged to move independently of said driving and driven parts, an auxiliary clutch adapted to connect said holder to said driving part, means adapted to be operated independently of the operating condition of the main clutch for throwing in and out said auxiliary clutch, and means for arresting said holder after said auxiliary clutch has been thrown out.

4. A centrifugal friction-clutching device comprising a main clutch including a driving and a driven part, friction faces on both parts, centrifugal elements adapted to connect said friction faces for torque transmission, a holder for said centrifugal elements which is arranged to move independently of said driving and driven parts, a clutching member forming one part of an auxiliary clutch on said holder, a corresponding member on said driving part forming the other part of said auxiliary clutch, a brake member on said holder, a fixed member adapted to cooperate with said brake member, said brake member and said clutching member being spaced apart for such a distance on said holder that they will not engage their corresponding members at the same time, and means adapted to be operated independently of the operating condition of the main clutch for throwing in and out said auxiliary clutch.

5. A centrifugal friction-clutching device comprising a main clutch including a driving and a driven part, friction faces on both parts, centrifugal elements adapted to connect said friction faces for torque transmission, a holder for said centrifugal elements which is arranged to move independently of said driving and driven parts, an auxiliary friction clutch adapted to connect said holder to said driving part, resilient means for throwing in said auxiliary clutch, and means adapted to be operated independently of the operating condition of the main clutch for throwing out said auxiliary clutch against the action of said resilient means.

6. A centrifugal friction-clutching device comprising a main clutch including a driving and a driven part, friction faces on both parts, centrifugal elements adapted to connect said friction faces for torque transmission, a holder for said centrifugal elements which is arranged to move independently of said driving and driven parts, a clutching member forming one part of an auxiliary clutch on said holder, a corresponding member on said driving part forming the other part of said auxiliary clutch, a brake member on said holder, a fixed member adapted to cooperate with said brake member, said brake member and said clutching member being adapted to engage their corresponding members upon axial displacement of said holder in opposite directions, and means adapted to be operated independently of the operating condition of the main clutch for throwing in and out said auxiliary clutch.

7. A centrifugal friction-clutching device comprising a main clutch including a driving and a driven part, mounted for relative axial displacement, friction faces on both parts, a bearing made up by a race on said driving, and by another race on said driven part, said races converging toward their perimeter, rotary centrifugal elements inserted between said converging races and adapted to connect said friction faces for torque transmission, as the radial distance of said elements from the axis of said clutch varies, a member which is arranged to move independently of said driving and driven parts, a cage on said member for engaging said centrifugal elements, an auxiliary clutch adapted to connect said member to said driving part, and means adapted to be operated independently of the operating condition of the main clutch for throwing in and out said auxiliary clutch.

8. A centrifugal friction-clutching device comprising a main clutch including a driving and a driven part, mounted for relative axial displacement, friction faces on both parts for direct engagement, centrifugal elements engaging between said driving and driven parts and adapted to connect said friction faces for torque transmission, as the radial distance of said elements from the axis of the clutch varies, a holder for said centrifugal elements which is arranged to move independently of said driving and driven parts, an auxiliary clutch adapted to connect said holder to said driving part, and means adapted to be operated independently of the operating condition of the main clutch for throwing in and out said auxiliary clutch.

9. A centrifugal friction-clutching device comprising a main clutch including a driving and a driven part, a friction face on one of said parts, a friction lining connected to one of said parts for rotation therewith and having a yielding portion for engaging the friction face on the other part, centrifugal elements engaging said lining on the side opposite said friction face, a holder for said centrifugal elements which is arranged to move independently of said driving and driven parts, an auxiliary clutch adapted to connect said holder to said driving part, and means adapted to be operated independently of the operating condition of the main clutch for throwing in and out said auxiliary clutch.

10. A centrifugal friction-clutching device comprising a main clutch including a driving and a driven part, friction faces on both parts, centrifugal elements adapted to connect said friction faces for torque transmission, as the radial distance of said elements from the axis of said clutch varies, a holder for said centrifugal elements which is arranged to move independently of said driving and driven parts, an auxiliary friction clutch adapted to connect said holder to said driving part, and means adapted to be operated independently of the operating condition of the main clutch for throwing in and out said auxiliary clutch.

11. A centrifugal friction-clutching device comprising a main clutch including a driving and a driven part, friction faces on both parts, centrifugal elements adapted to connect said friction faces for torque transmission, as the radial distance of said elements from the axis of said clutch varies, a holder for said centrifugal elements which is arranged to move independently of said driving and driven parts, an auxiliary friction clutch adapted to connect said holder to said driving part, a handle for throwing in and out said auxiliary friction clutch independently of the operating condition of the main clutch, means for fixing said handle in two final positions, and resilient means operatively connected to said handle so as to hold engaged the friction members of said auxiliary clutch under resilient pressure in one of the final positions of said holder.

HUGO JUNKERS.